United States Patent
Palsson

(10) Patent No.: US 10,426,183 B2
(45) Date of Patent: Oct. 1, 2019

(54) APPARATUS AND A METHOD FOR RECOVERY OF MEAL

(71) Applicant: HEDINN HF, Hafnarfjordur (IS)

(72) Inventor: Gunnar Palsson, Reykjavik (IS)

(73) Assignee: HEDINN HF, Hafnarfjordur (IS)

( * ) Notice: Subject to any disclaimer, the term of this patent is extended or adjusted under 35 U.S.C. 154(b) by 258 days.

(21) Appl. No.: 15/309,359

(22) PCT Filed: May 5, 2015

(86) PCT No.: PCT/IS2015/050005
§ 371 (c)(1),
(2) Date: Nov. 7, 2016

(87) PCT Pub. No.: WO2015/170349
PCT Pub. Date: Nov. 12, 2015

(65) Prior Publication Data
US 2017/0071238 A1    Mar. 16, 2017

(30) Foreign Application Priority Data

May 5, 2014   (IS) .............................................. 9045

(51) Int. Cl.
*A23L 17/10*    (2016.01)
*A23K 10/22*    (2016.01)

(52) U.S. Cl.
CPC .............. *A23L 17/10* (2016.08); *A23K 10/22* (2016.05); *A23V 2002/00* (2013.01)

(58) Field of Classification Search
CPC ...... A23L 17/10; A23K 10/22; A23V 2002/00
See application file for complete search history.

(56) References Cited

U.S. PATENT DOCUMENTS

| | | | | |
|---|---|---|---|---|
| 2,360,100 | A * | 10/1944 | Bowen | F26B 3/20 |
| | | | | 165/86 |
| 4,036,994 | A * | 7/1977 | Ear | A47J 37/06 |
| | | | | 426/233 |
| 4,335,146 | A | 6/1982 | Bladh | |
| 4,344,976 | A | 8/1982 | Bladh | |
| 4,532,144 | A * | 7/1985 | Vernet | C11B 1/12 |
| | | | | 426/472 |
| 2011/0305800 | A1* | 12/2011 | Iannazzo | A23L 7/117 |
| | | | | 426/74 |

(Continued)

FOREIGN PATENT DOCUMENTS

| | | |
|---|---|---|
| GB | 612554 A | 11/1948 |
| WO | 8301275 A1 | 4/1983 |

(Continued)

OTHER PUBLICATIONS

Iceland Search Report for corresponding Iceland Application No. 9045, dated Aug. 14, 2014.

(Continued)

*Primary Examiner* — Anthony J Weier
(74) *Attorney, Agent, or Firm* — Workman Nydegger

(57) ABSTRACT

The present invention relates to a process for continuous manufacture or recovery of meal and oil from organic material. More specifically the present invention relates to a device and a method for regulating the energy usage and distribution of energy within the system for maintaining continuous production of meal and oil.

20 Claims, 4 Drawing Sheets

(56) References Cited

U.S. PATENT DOCUMENTS

2012/0088019 A1* 4/2012 Bourg, Jr. ............. A47J 37/044
                                                        426/466
2013/0025153 A1* 1/2013 Mengat ................... F26B 17/20
                                                         34/282

FOREIGN PATENT DOCUMENTS

WO      8303042 A1    9/1983
WO      8401884 A1    5/1984

OTHER PUBLICATIONS

International Search Report for corresponding International PCT Application No. PCT/IS2015/050005, dated Jul. 14, 2015.

* cited by examiner

APPARATUS AND A METHOD FOR RECOVERY OF MEAL

FIELD OF THE INVENTION

The present invention relates to a method for continuous manufacture of fish-meal and oil from fish raw material. More specifically the present invention relates to a method and an apparatus for regulating the energy usage and distribution of energy within the apparatus for maintaining continuous production of fish meal and oil.

BACKGROUND OF THE INVENTION

Preparation of fish meal from raw material and isolating fish oil from the same is well a known method and the technology currently used have been used for many decades. The process and device involves separation of the oil and removal of water from the raw material initially containing typically 75% water, 5% oil and 20% of dry matter. In general the raw material is brought to a boiling point in a cooker. The material obtained from the cooker is transferred to a press to squeeze out as much liquid as possible from the solid phase. The liquid phase is further separated in a decanter into a phase of solids and water on one hand and an oil phase on the other hand. The water is then removed from the solid/water phase in a drier and evaporators. The solid phase from the press is mixed with the solid phase from the evaporators and transferred into driers and then cooled down after drying.

U.S. Pat. No. 4,344,976 discloses a typical process for recovery of meal of high protein quality and oil from fish, where heating of the fish mass is carried out in any conventional way, and oil is separated from the heated fish mass by means of a centrifuge provided with a separate outlet for separated oil phase. In this publication the stick water and sludge discharged from the centrifuge are fed together to an evaporation unit where the mixture of sludge and stick water is fed through one or several indirectly heated tubes. The internal walls of which are continuously cleaned by means of a scraping device and the outlet of which is connected to a separation space for steam and evaporated product. The product is then further dried in conventional drying step.

Production of high quality low-heat generated fish meal requires that the process is performed at low temperature in the later stages of the process. In the early stages, where the water content is above 40%, the temperature of the material is at 100° C. as it passes through the boilers. When the oil phase and part of the water has been removed, the rest of the process is performed at low temperature to preserve the proteins.

SUMMARY OF THE INVENTION

It is an object of the present invention to overcome or ameliorate the aforementioned drawbacks of the prior art and to provide an improved and/or alternative and/or additional method and a device for recovery of meal from organic material. It is one preferred object of the present invention to provide a device with a simple and robust design in order to fully dry organic material in a second drying step, utilizing evaporated steam from a pre-drying step as a heating means. Moreover, it is a preferred object of the present invention to provide a cost efficient design, preferably where the energy provided to heat a dryer unit used in the process is the mayor source of energy required for performing the remaining steps of the process are controlled by the energy derived from the dryer. Another preferred object of the present invention is to provide a device having a compact design which may facilitate maintaining a low temperature of the raw material and its derivatives, such that the proteins remain relatively intact. It is also a preferred object of the present invention to provide a device with an improved operability and/or an increased ease of use during operation and set up of the device.

The object(s) underlying the present invention is (are) particularly solved by the features defined in the independent claims. The dependent claims relate to preferred embodiments of the present invention. Further additional and/or alternative aspects are discussed below.

More specifically the process of the present invention teaches fully drying the material in a second drying step, utilizing the evaporated steam from a pre-drying step as a heating means as well as blowing air through the second dryer.

The present invention provides a new apparatus and method for operating devices for recovery of meal from organic material in an energy efficient manner. The heart of the system is a pre-dryer, which is also a steam boiler which receives external energy to heat up the material and generate steam. The steam generated in the pre-dryer can be sufficient to sustain the energy need of the system. A combination if blowing dry air into a secondary dryer while removing the remaining water from the material and using the steam from the pre-dryer to heat up thermal surfaces on the secondary dryer is a new and improved method for producing high quality meal organic material. The relationship between the water level in the meal leaving the secondary dryer and material being pumped into the pre-dryer at a constant energy usage is used to regulate the process so that if the water level is too high, less material is pumped into the pre-dryer and vice versa.

The present invention further provides a new apparatus and a method for the production of high quality, low-heat generated fish meal, where the temperature of the material or its derivatives normally exits the drying stage close to 40° C. in a dry form. Furthermore, the method and the device of the present invention focus on the use and re-use of the energy provided for the dryer unit to control and supply heat/energy the remaining components of the system to facilitate the production of high quality low-heat generated fish meal.

In a first aspect of the present invention a method is provided for recovery of meal from organic material. The method comprises transferring the material to a pre-dryer for evaporating a portion of the water phase from the material, where the pre-dryer is a steam boiler receiving external energy to heat up the material in the pre-dryer and to generate steam. Thereafter transferring the material to an secondary dryer for removing more of the water phase from the material, wherein the removal of water in the secondary dryer 5 is a two-step process of: 1) transferring the steam generated in the pre-dryer to the secondary dryer to heat up the thermal surfaces of the secondary dryer 5 and thereby the material in the secondary dryer, and 2) blowing dry air though the secondary dryer, where it blends with the material during evaporation and the air exits saturated out of the secondary dryer.

In a second aspect of the present invention a method is provided for recovery of meal from organic material. The method comprises transferring the material to a pre-dryer for evaporating a portion of the water phase from the material, where the pre-dryer is a steam boiler receiving external energy to heat up the material in the pre-dryer and to generate steam. Thereafter transferring the material to an secondary dryer for removing more of the water phase from the material, wherein the removal of water in the secondary dryer 5 is a two-step process of: 1) transferring the steam generated in the pre-dryer to the secondary dryer to heat up the thermal surfaces of the secondary dryer 5 and thereby the material in the secondary dryer, and 2) blowing dry air though the secondary dryer, where it blends with the material during evaporation and the air exits saturated out of the secondary dryer.

In a third aspect of the present invention an apparatus is provided for recovery of meal from organic material. The apparatus comprises a pre-dryer for removing a portion of the water phase from the material, said pre-dryer being a steam boiler receiving external energy to heat up the material in the pre-dryer and generate steam, and a secondary dryer for removing more of the water phase from the material. The secondary dryer comprises a heat exchange element to receive steam generated in the pre-dryer to heat up the material in the secondary dryer and the secondary dryer further comprises an air inlet for receiving dry air being blown into the secondary dryer, where it blends with the material during evaporation and an air outlet for directing saturated air out of the secondary dryer.

In a forth aspect of the present invention an apparatus and a method is provided for operating devices for recovery of meal from organic material. They comprise a pre-cooker for pre-heating the material, a cooker for heating the material to above 80° C., a separating device for separating the oil phase from the rest of the material, a pre-dryer for removing a portion of the water phase from the material and secondary dryer for removing more of the water phase from the material. The method is characterised in that the energy usage and distribution of energy for maintaining continuous production of meal comprises the following steps:

generating steam in the pre-dryer 4 using energy from an external source,
bringing the material in the pre-dryer 4 to a boiling point, directing the steam generated steam boiler to:
a) the secondary dryer 5, where condense forms partially on thermal surfaces of the secondary dryer 5, and;
b) to the after cooker 2, where it condenses on thermal surfaces of the cooker 2, and
transporting water condensate from the secondary dryer 5 and the cooker 2 to the pre-cooker 1 to pre-heat the material, and
directing warm and saturated air out of the secondary dryer 5 and directing dry air into the secondary dryer 5, where it blends with the material.

In a fifth aspect of the present invention an apparatus and a method is provided for operating devices for recovery of meal from organic material. They comprise transferring the material to a pre-dryer for evaporating a portion of the water phase from the material, where the pre-dryer is a steam boiler receiving external energy to heat up the material in the pre-dryer and to generate steam. Thereafter transferring the material to an secondary dryer for removing more of the water phase from the material, wherein the removal of water in the secondary dryer 5 is a two-step process of: 1) transferring the steam generated in the pre-dryer to the secondary dryer to heat up the thermal surfaces of the secondary dryer 5 and thereby the material in the secondary dryer, and 2) blowing dry air though the secondary dryer, where it blends with the material during evaporation and the air exits saturated out of the secondary dryer. Furthermore, the water content/humidity of the meal leaving the secondary dryer is detected by a sensor and upon a fixed external energy being introduced to the pre-dryer, more material is pumped into the secondary dryer if the water content of the meal is too low, but less material is pumped into the secondary-dryer if the water content of the meal is too high.

DESCRIPTION OF THE INVENTION

Figure 1:
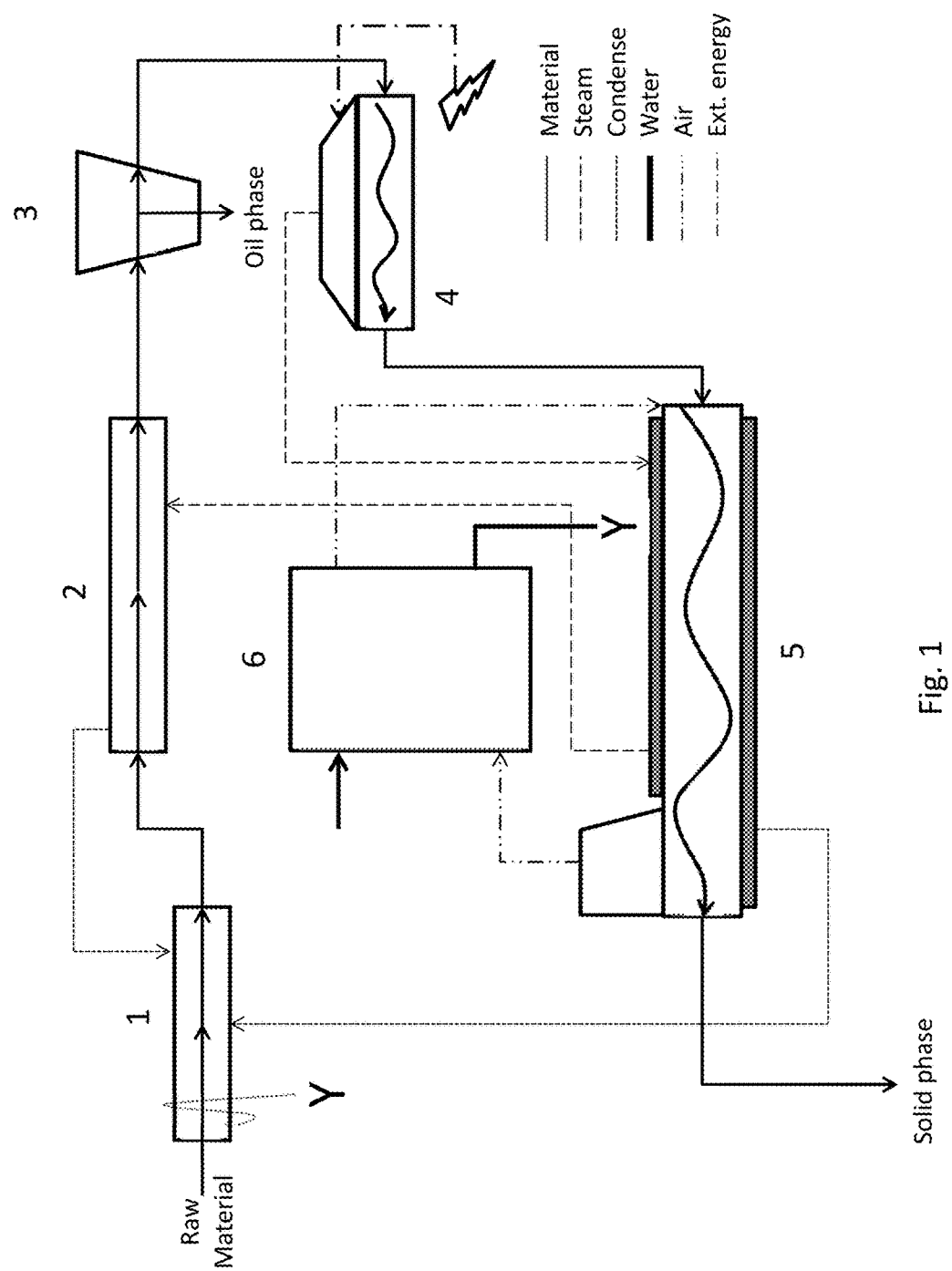
FIG. 1 shows a schematic drawing of system for recovery of fish meal and oil from raw material.

The following embodiments and definitions relate to the process, the method and the apparatus of the invention.

In the present context the method, the apparatus and the process relate to production of fish-meal or meat-meal from raw materials or organic material. At the start of the process the raw material is fish and fish "waste" or organic material. Through the process the "material" becomes a slurry mixture of oil, water and solid material and then the oil phase can be separated from the water/solid material. The rest of the process then deals with removing water from the water/solid material to produce meal. For the purpose of definition herein the term raw material is used for the starting material. Thereafter and until the meal leaves the process, the matter going through the process is referred to as "the material". In the present context the term "system" is used when describing the interplay of the method and the apparatus.

In the present context, the oil phase from the material is separated from the solid and the water phase in a separation devices such as a decanter.

In an embodiment of the present invention, the material is heated up in one or more cookers before it is transferred into the pre-dryer 4. The heating may be performed in two steps, 1) in a pre-cooker 1 to pre-heat the material and 2) in a cooker 2 to heat the material further.

In an embodiment of the present invention, the steam generated in the pre-dryer is partially directed to a cooker, where it condenses on thermal surfaces on/around the cooker.

In an embodiment of the present invention, the water condensate from the secondary dryer and cooker is transported to the pre-cooker to pre-heat the material.

In an embodiment of the present invention, the oil phase is separated from the material in a separating device after heating the material in one or more cookers and prior to transferring it into the pre-dryer.

In an embodiment of the present invention, the energy provided to the pre-dryer is sufficient for performing all the steps in the process where a pre-cooker, cooker, separating device, pre-dryer and a secondary dryer are used to produce meal from organic material.

In an embodiment of the present invention, the material is transferred into pre-dyer 4 to keep constant weight of material in the pre-dryer 4.

In an embodiment of the present invention, fixed external energy is introduced to the pre-dryer 4 where more material is transferred into the secondary dryer if the water content of the meal is too low, but less material is pumped into the secondary-dryer if the water content of the meal is too high.

In an embodiment of the present invention, the water content of the air leaving the secondary dryer is reduced in a water scrubber.

In an embodiment of the present invention, the organic material is from fish or meat.

In an embodiment of the present invention, the only component receiving external energy is the pre-dryer.

In an embodiment of the present invention the material is transported from a decanter to the pre-dryer by a transfer means such as a screw conveyor. The screw-conveyor is positioned inside the piping or casing which is heated by a portion of the steam generated in the pre-dryer. This is to prevent further loss of temperature in the material.

In an embodiment of the present invention the warm air leaving the secondary dryer is between 50-70° C., such as 55-65° C. or 60° C.

In an embodiment of the present invention the water condensate from the secondary dryer 5 and cooker 2 is transported to the cooker 1 heats the material up to between 25-40° C., such as between 30-38° C. or 35° C. The steam generated in the pre-dryer heats the material in the cooker to between 75-90° C., such as between 80-87° C. or 85° C. Also, the material is between 90-100° C. as it enters the secondary dryer. Furthermore, the air leaving the secondary dryer is around 60° C. and the dry meal is around 40° C.

In an embodiment of the present invention the material leaving the pre-dryer can be re-directed into the decanter to extract more of the oil phase from the material.

In an embodiment of the present invention additional energy is introduced into the secondary dryer 5 to increase the evaporation of water from the material.

In an embodiment of the present invention the temperature of the material is prevented from decreasing during the transport from the decanter 3 to the pre-dryer 4, by directing a portion of the steam from the pre-dryer to a heating chamber associated with the means for transporting the material from the decanter 3 to the pre-dryer 4.

DETAILED DESCRIPTION OF THE INVENTION

The present invention will become more fully understood from the detailed description given hereinafter and the accompanying drawings which are given by way of illustration only, and thus, are not limitative of the present invention. The embodiments shown in the drawings are explained with reference numbers. The term "system" is used here below when describing the interplay of the method and the apparatus.

FIG. 1 shows a schematic drawing of system for recovery of fish meal and oil from raw material, where the route of the material through the system is shown as well as the input energy and the distribution of energy through the system. The mechanical components of the system comprise a preparation device, such as a hasher (not shown), a cooker 1, a cooker 2, separating station 3, a pre-dryer 4 and a secondary dryer 5. The figure shows an embodiment of the invention where the only component receiving external energy is the pre-dryer 4 (being a steam boiler) and explains how the energy usage and distribution of energy within the system is controlled for maintaining continuous production of fish meal and oil. The figure also shows a water scrubber 6, which is used to cool down air coming from the secondary dryer 5. The route of the material through the system is shown with lines and arrows from raw material entering the cooker 1, separation of the oil phase from the water/solid phase in the separating station 3 and removal of the water phase in the pre-dryer 4 and the secondary dryer 5 before delivering the solid phase (dry meal) at the end of the process. The figure also shows how the input energy is transformed into steam and condense for driving the remaining components of the system. The energy distribution and the management of the system will be further explained in drawings 2-4, showing that the components of the process and generation of high quality low-heat generated fish meal is actually regulated by fully using the energy in the system.

Figure 2:
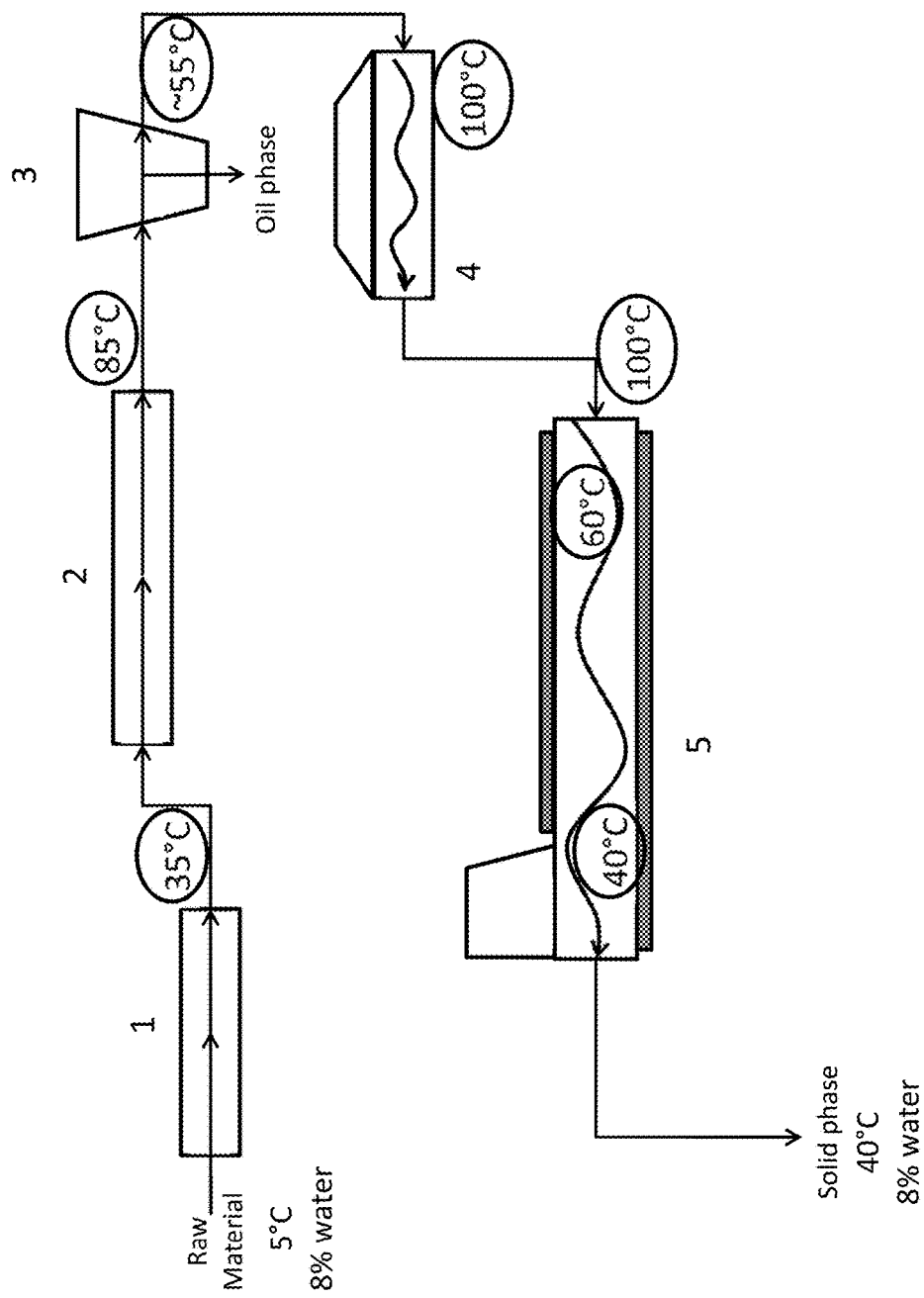
FIG. 2 shows a route of the material through the system of FIG. 1.

FIG. 2 further explains the route of the material through the system. The raw material is most often processed by some kind of preparation device (not shown) to grind the raw material before it undergoes the process of boiling, separation of the oil phase from the rest and then evaporation of the water phases to deliver the meal. The raw material is then pumped into the cooker 1, which is a tube-boiler in this embodiment. The material is pre-heated in a cooker 1 to around 35° C. The material is guided into the cooker 2 by some transport means, such as a winding tube. The material heats up to around 85° C. in the cooker 2 as it moves towards an out-feed opening together with a precipitate of bones and sand. A piston pump is positioned after the cooker 2 to pump the material into the separation device 3. The piston pump comprises a stirring means to bring the material to a homogeneous state before it is transported into the separation device 3. The precipitate is separated from the material before the oil phase is separated from the solid/water phase in a separating station. The heat of the material decreases from 80° C. to between 50-60° C. during the separation phase (shown as approximately 55° C. in the drawing). The material comprising the water/solid phase is transported from the decanter 3 to the pre-dryer 4 by a transfer means such as a screw conveyor (not shown).

The pre-dryer of the system heats the material to around 100° C. by heating the inner surface of the pre-dryer. Therefore, it is important to continuously scrape the material from the inner surface of the cylinder in order to prevent the material from burning if it stays to long adherent to the inner surface. The pre-dryer can be positioned on load cells and subjected to constant weighing to regulate the in-feeding into the pre-dryer. A pump is positioned between the pre-dryer 4 and the main evaporator/dryer 5. This pump may function as the main controller the material through the whole unit. In this part of the process, the consistency of the material is high. In the pre-dryer, up to about 70% of the water that is removed by boiling. The remaining material proceeds as a slurry to the secondary dryer 5, where the rest of the water to be removed evaporates, leaving the meal at 40° C. as it exits the device and the process.

The after-dryer/secondary dryer 5 is built as a cylinder with a centrally arranged rotor along the cylinder. The material which enters the secondary dryer is a slurry paste and devices such as scrapers can be used to rotate the paste to interact with the air-phase therein. The slurry paste material is 100° C. as it enters the secondary dryer, but as the paste reacts with the air phase and the hot surfaces of the cylinder the heat leaves the paste with the water molecules. The dry meal (8% water) is around 40° C. as it leaves the system and as the meal leaves the secondary dryer it passes through a grinder to grind the meal.

Figure 3:
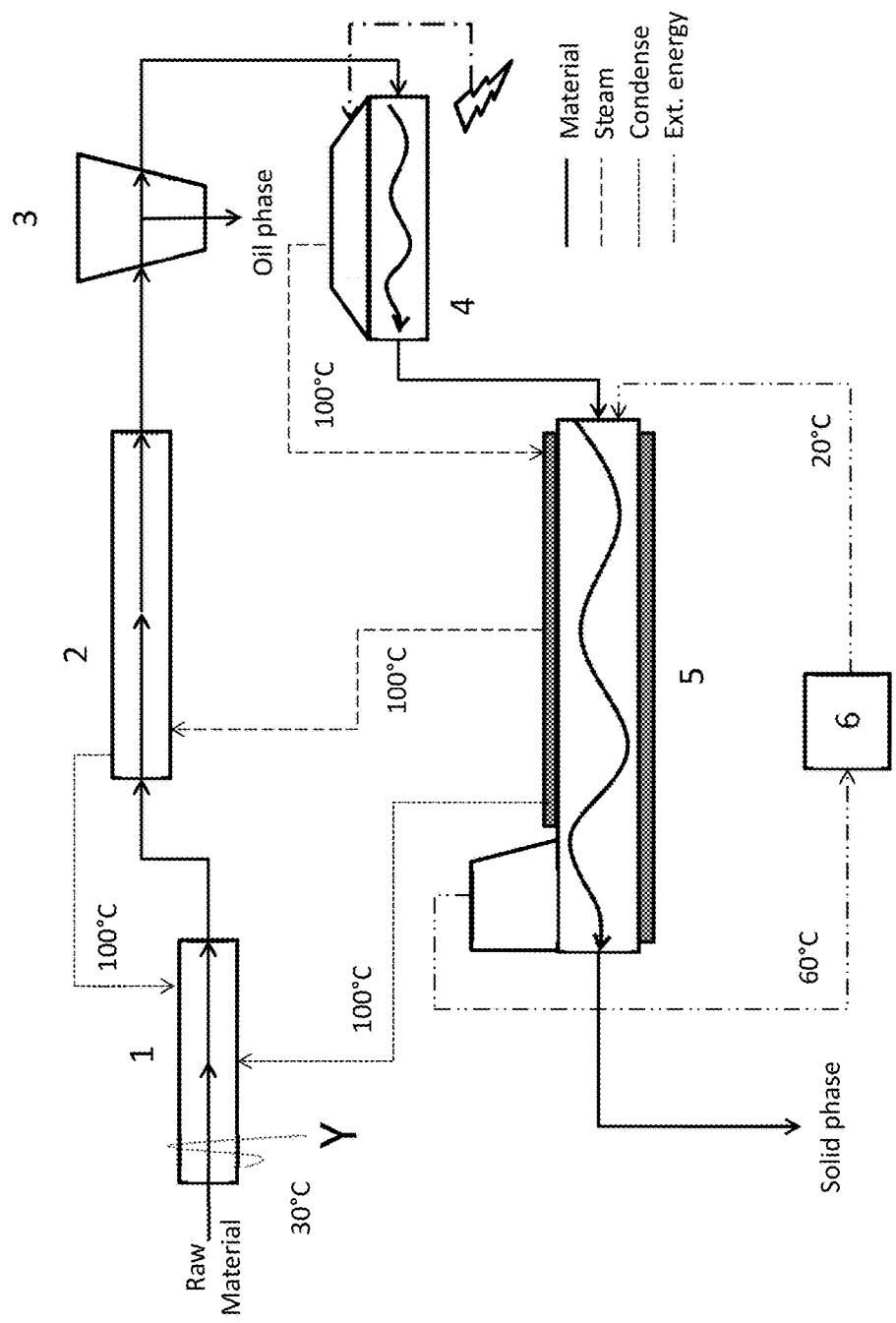
FIG. 3 exemplifies utilization of input energy in the system and re-use of that energy.

FIG. 3 demonstrates the utilization of input energy in the system and re-use of that energy to perform the process of the unit for generating high quality low-heat generated meal. Instead of following the material through the system, the route of the energy is followed in this drawing. As the pre-dryer is a steam boiler, the terms steam boiler or pre-dryer are used equally for the purpose of describing the drawings. The steam boiler/pre-dryer 4 receives energy from a source outside the system. The steam boiler heats the inner surface (the cylinder) of the pre-dryer. The steam (100° C.) generated in the steam boiler is transported therefrom to the secondary dryer 5 and to the cooker 2. The steam condenses in part on the thermal surfaces of the secondary dryer and the energy released by heating the secondary dryer is used to trigger the phase change therein. To keep the phase change in process and to remove the stem formed, air @ 20° C. is circulated through the secondary dryer. The air blends with the slurry and meal through an action of a rotor (not shown). Due to the phase change of the temperature of the blend is maintained @ 50° C., but in that manner energy flows continuously into the blend through thermal surfaces of the secondary dryer. The air leaving the secondary dryer is 60° C. and is blown through a washing tower (see FIG. 4). In the secondary dryer, about 60% of steam from the pre-dryer 4 is condensed, while the rest of steam continues to the cooker 2 and condenses on its thermal surfaces. The energy, which is released in the cooker 2 heats the material from 35° C. to 85° C. in the cooker 2. The water condensate from the secondary dryer 5 and cooker 2 is transported to the cooker 1 and the energy released from the condensate is used to heat the raw material in cooker 1 from 5° C. up to 35° C. and condensed water directed out of the system at 30° C.

The heat of the material decreases from 80° C. to between 50-60° C. during the separation phase in the decanter 3. The material is transported from the decanter 3 to the pre-dryer 4 by a transfer means such as a screw conveyor (not shown). The screw-conveyor can be positioned inside the piping or casing which is heated by a portion of the steam generated in the pre-dryer 4. This is to prevent further loss of temperature in the material.

Figure 4:
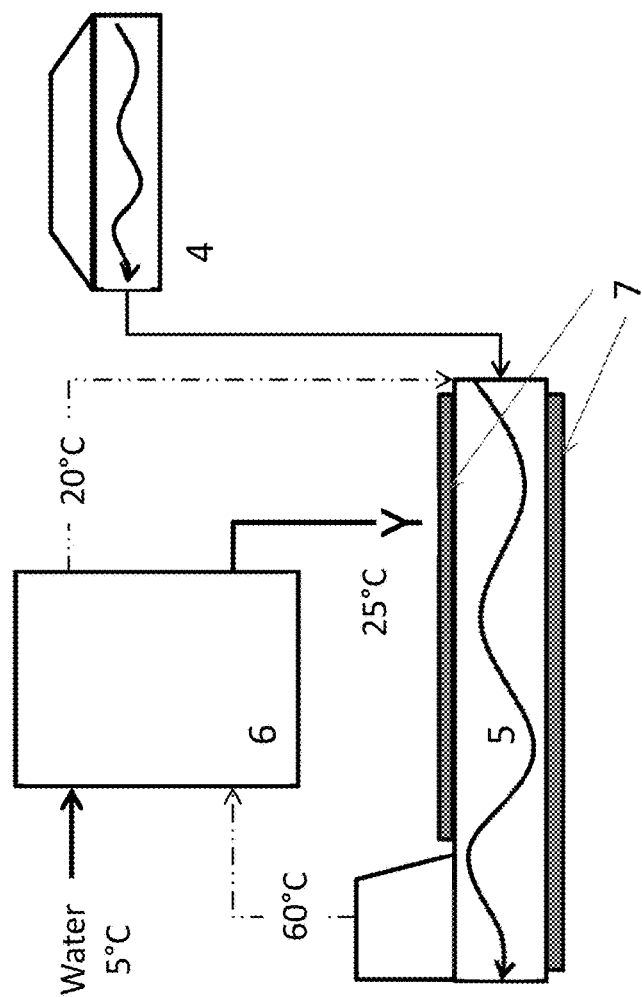
FIG. 4 shows how air from the secondary dryer is cooled down according to one embodiment of the present invention.

FIG. 4 shows how air from the secondary dryer is cooled down according to one embodiment of the present invention. The secondary-dryer in this embodiment is built as a cylinder with a centrally arranged rotor along the cylinder. Around the rotor is a coat/cover 7, where steam from the pre-dryer is condensed in the cover. The slurry paste material entering the secondary dryer is rotated in the cylinder to allow it to interact with air which is blown into the cylinder at the entry end of the secondary dryer. In this embodiment the air is at 20° C. when it is blown into the secondary dryer and the slurry paste material is 100° C. as it enters the secondary dryer. The reaction of the material with the drying air and the hot surfaces of the cylinder causes evaporation from the material and energy leaves the system in the form of saturated air, which is between 50 and 60° C. as it leaves the secondary dryer 5. Although most of the meal leaves the secondary dryer 5 as grinded material, some fine meal particles leave the secondary dryer 5 with the air. The fine meal is separated in a "air washing tower" (water scrubber) or cyclone 7 and is either directed to join the grinded meal from the secondary dryer or is stored separately. The water scrubber 6 receives air from the secondary dryer 5 at a temperature of about 60° C. The air is cooled down to around 20° C. and then directed again into the dryer 5 to further dry the half-dry paste from the pre-dryer 4. Although a water scrubber is shown herein, warm humid air can simply be blown out of the secondary dryer 5 and dry air can be injected into the secondary dryer to aid with the evaporation process according to the present invention.

The present invention covers further embodiments with any combination of features from different embodiments described above. Reference signs in the claims are provided merely as a clarifying example and shall not be construed as limiting the scope of the claims in any way. The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantial constant" shall also cover exactly constant). The terms "a", "an", "first", "second" etc do not preclude a plurality.

The invention claimed is:

1. A method for recovery of meal from organic material, the method comprising;
    transferring the organic material to a pre-dryer for evaporating a portion of the water phase from the organic material, said pre-dryer being a steam boiler receiving external energy to heat up the organic material in the pre-dryer and generate steam, and
    transferring the organic material to a secondary dryer for removing more of the water phase from the organic material;
    wherein the removal of water in the secondary dryer is a two-step process of:
    transferring the steam generated in the pre-dryer to the secondary dryer to heat up the thermal surfaces of the secondary dryer and thereby the organic material in the secondary dryer, and
    blowing dry air though the secondary dryer, where it blends with the organic material during evaporation and the air exits saturated out of the secondary dryer.

2. The method according to claim 1, wherein the organic material is heated up in one or more cookers before it is transferred into the pre-dryer.

3. The method according to claim 2, wherein heating is performed in two steps in a pre-cooker to pre-heat the organic material and in a cooker to heat the organic material further.

4. The method according to claim 1, wherein a steam generated in the pre-dryer is partially directed to a cooker, where it condenses on thermal surfaces of the cooker.

5. The method according to claim 1, wherein water condensate from the secondary dryer and cooker is transported to the pre-cooker to pre-heat the material.

6. The method according to claim 2, wherein an oil phase is separated from the material in a separating device after heating the organic material in one or more cookers and prior to transferring it into the pre-dryer.

7. The method according to claim 1, wherein the energy provided to the pre-dryer is sufficient for evaporating water, generating steam, and heating the organic material.

8. The method according to claim 1, wherein the organic material is transferred into the pre-dyer to keep constant weight of the organic material in the pre-dryer.

9. The method according to claim 1, wherein fixed external energy is introduced to the pre-dryer and more organic material is pumped into the secondary dryer if the water content of the meal is too low.

10. The method according to claim 1, wherein fixed external energy is introduced to the pre-dryer and less organic material is pumped into the secondary-dryer if the water content of the meal is too high.

11. The method according to claim 1, wherein the water content of the air leaving the secondary dryer is reduced in a water scrubber.

12. The method according to claim 1, wherein the organic material is from fish.

13. The method according to claim 1, wherein the organic material is from meat.

14. An apparatus for recovery of or meal from organic material, the apparatus comprising;

a pre-dryer for removing a portion of the water phase from the organic material, said pre-dryer being a steam boiler receiving external energy to heat up the organic material in the pre-dryer and generate steam, and a secondary dryer for removing more of the water phase from the organic material, wherein the secondary dryer comprising a heat exchange element to receive steam generated in the pre-dryer to heat up the organic material in the secondary dryer, and the secondary dryer further comprising an air inlet for receiving dry air being blown into the secondary dryer, where it blends with the organic material during evaporation and an air outlet for directing saturated air out of the secondary dryer.

15. The apparatus according to claim 14, further comprising one or more cookers to heat up the organic material before it is transferred into the pre-dryer.

16. The apparatus according to claim 15, wherein heating is performed by a pre-cooker to pre-heat the organic material and in a cooker to heat the organic material further.

17. The apparatus according to claim 14, further comprising separation device 3 for separating the oil phase from the organic material.

18. The apparatus according to claim 14, further comprising a piston pump for loading the organic material into the cooker.

19. The apparatus according to claim 14, wherein a piston pump is positioned after the cooker to pump the organic material into a separation device.

20. The apparatus according to claim 19, wherein the piston pump comprises a stirring means to bring the organic material to a homogenous state before it is transported into the separation device.

* * * * *